(12) United States Patent (10) Patent No.: US 8,458,134 B2
Benhase et al. (45) Date of Patent: Jun. 4, 2013

(54) NEAR CONTINUOUS SPACE-EFFICIENT DATA PROTECTION

(75) Inventors: Michael Thomas Benhase, Tucson, AZ (US); Theresa Mary Brown, Tucson, AZ (US); Lokesh Mohan Gupta, Tucson, AZ (US); Carol Santich Mellgren, Tucson, AZ (US); Gail Andrea Spear, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 61 days.

(21) Appl. No.: 13/076,383

(22) Filed: Mar. 30, 2011

(65) Prior Publication Data

US 2012/0254122 A1 Oct. 4, 2012

(51) Int. Cl.
*G06F 17/00* (2006.01)
(52) U.S. Cl.
USPC .......... 707/649; 707/610; 707/640; 707/661; 711/161
(58) Field of Classification Search
None
See application file for complete search history.

(56) References Cited

U.S. PATENT DOCUMENTS

| | | | |
|---|---|---|---|
| 6,981,114 B1 * | 12/2005 | Wu et al. ................ 711/162 |
| 7,558,926 B1 | 7/2009 | Oliveira et al. | |
| 7,587,431 B1 | 9/2009 | Rao et al. | |
| 7,613,750 B2 | 11/2009 | Valiyaparambil et al. | |
| 7,680,843 B1 | 3/2010 | Panchbudhe et al. | |
| 7,711,712 B2 | 5/2010 | Kano | |
| 7,802,134 B1 * | 9/2010 | Sobel et al. ............. 714/15 |
| 7,853,566 B2 * | 12/2010 | Cisler et al. ............. 707/654 |
| 7,865,470 B2 * | 1/2011 | Fries et al. .............. 707/640 |
| 8,010,496 B2 * | 8/2011 | Okada et al. ............ 707/653 |
| 8,145,601 B2 * | 3/2012 | Zizys et al. ............. 707/640 |
| 2005/0182910 A1 * | 8/2005 | Stager et al. ............ 711/162 |
| 2006/0053121 A1 * | 3/2006 | Zizys et al. ............. 707/100 |
| 2006/0053304 A1 * | 3/2006 | Fries et al. .............. 713/189 |
| 2008/0027998 A1 | 1/2008 | Hara | |
| 2008/0034004 A1 * | 2/2008 | Cisler et al. ............. 707/200 |
| 2008/0040402 A1 | 2/2008 | Judd | |

(Continued)

FOREIGN PATENT DOCUMENTS

CN 101650680 A 2/2010

OTHER PUBLICATIONS

Cisco Small Business Version 3.1 Continuous Data Protection for Files, Administration Guide, 2008.*

(Continued)

*Primary Examiner* — Hung Le
(74) *Attorney, Agent, or Firm* — Nelson and Nelson; Daniel P. Nelson; Alexis V. Nelson

(57) ABSTRACT

A method for providing rolling continuous data protection of source data is disclosed. In one embodiment, such a method includes enabling a user to select source data and establish a first interval when point-in-time copies of the source data are generated. The method further enables the user to specify a first number of point-in-time copies to retain at the first interval. The method further enables the user to specify a second number of point-in-time copies to retain at a second interval, wherein the second interval is a ($n \geq 2$) multiple of the first interval. The method further enables the user to specify a third number of point-in-time copies to retain at a third interval, wherein the third interval is a ($n \geq 2$) multiple of the second interval. A corresponding apparatus and computer program product are also disclosed.

17 Claims, 9 Drawing Sheets

U.S. PATENT DOCUMENTS

| | | | |
|---|---|---|---|
| 2008/0059894 A1* | 3/2008 | Cisler et al. | 715/762 |
| 2008/0154914 A1 | 6/2008 | Kan et al. | |
| 2008/0168218 A1 | 7/2008 | Arakawa et al. | |
| 2008/0208932 A1 | 8/2008 | Tsuge et al. | |
| 2009/0077557 A1* | 3/2009 | Ichikawa et al. | 718/102 |
| 2009/0109823 A1 | 4/2009 | Joukov | |
| 2009/0182784 A1 | 7/2009 | Rohit et al. | |
| 2009/0319582 A1* | 12/2009 | Simek et al. | 707/204 |
| 2010/0198788 A1 | 8/2010 | Sim-Tang | |
| 2011/0083088 A1* | 4/2011 | Cisler et al. | 715/763 |
| 2011/0252432 A1* | 10/2011 | Sim-Tang et al. | 719/318 |
| 2011/0264635 A1* | 10/2011 | Yang | 707/695 |
| 2012/0317079 A1* | 12/2012 | Shoens et al. | 707/639 |

OTHER PUBLICATIONS

IBM Tivoli Continuous Data Protection for Files 3.1.8.0, Installation and User's Guide, Dec. 2010.*

Takakura, et al.; "Continuous Backup Systems Utilizing Flash Memory"; Data Engineering; Proceedings of the Ninth International Conference on Digital Object Identifier; 1993; pp. 439-446.

Sheng, et al.; "TH-CDP: An Efficient Block Level Continuous Data Protection System"; 2009 IEEE International Conference on Networking, Architecture, and Storage; IEEE Computer Society; 2009; pp. 395-404.

* cited by examiner

NEAR CONTINUOUS SPACE-EFFICIENT DATA PROTECTION

BACKGROUND

1. Field of the Invention

This invention relates to data backup, and more particularly to apparatus and methods for providing near continuous data protection in a space-efficient manner.

2. Background of the Invention

Data is often one of an organization's most valuable assets. Accordingly, it is paramount that an organization regularly back up its data, particularly its business-critical data. Statistics show that a high percentage of organizations, as high as fifty percent, are unable to recover from an event of significant data loss, regardless of whether the loss is the result of a virus, data corruption, physical disaster, software or hardware failure, human error, or the like. At the very least, significant data loss can result in lost income, missed business opportunities, and/or substantial legal liability. Accordingly, it is important that an organization implement adequate backup policies and procedures to prevent such losses from occurring.

Various different solutions exist for backing up an organization's data. One solution, referred to as near continuous data protection, involves taking periodic snapshots (point-in-time copies) of source data at fixed intervals, such as 1-hour or 24-hour intervals. If data is corrupted or lost, a snapshot may be used to restore the data to the state that existed when the snapshot was taken. Although effective, one disadvantage of this technique is that, as snapshots accumulate, the snapshots may consume significant amounts of storage space. This problem may be exacerbated by decreasing the time between snapshots (thereby increasing the number of snapshots), or by increasing the amount of time that snapshots are accumulated prior to deletion. A large number of snapshots can also negatively impact the I/O performance of the source data since, depending on the point-in-time-copy technology used, the snapshots may need to be updated when writes are performed to the source data.

In view of the foregoing, apparatus and methods are needed to more efficiently provide near continuous data protection. Ideally, such apparatus and methods will reduce or minimize the storage space consumed by snapshots of the source data. Further needed are apparatus and methods to reduce or minimize the I/O performance impact on the source data. Yet further needed are apparatus and methods to quickly restore data from a snapshot when needed.

SUMMARY

The invention has been developed in response to the present state of the art and, in particular, in response to the problems and needs in the art that have not yet been fully solved by currently available apparatus and methods. Accordingly, apparatus and methods have been developed to provide near continuous space-efficient data protection. The features and advantages of the invention will become more fully apparent from the following description and appended claims, or may be learned by practice of the invention as set forth hereinafter.

Consistent with the foregoing, a method for providing rolling continuous data protection of source data is disclosed herein. In one embodiment, such a method includes enabling a user to select source data and establish a first interval when point-in-time copies of the source data are generated. The method further enables the user to specify a first number of point-in-time copies to retain at the first interval. The method further enables the user to specify a second number of point-in-time copies to retain at a second interval, wherein the second interval is a ($n \geq 2$) multiple of the first interval. The method further enables the user to specify a third number of point-in-time copies to retain at a third interval, wherein the third interval is a ($n \geq 2$) multiple of the second interval.

A corresponding apparatus and computer program product are also disclosed and claimed herein.

BRIEF DESCRIPTION OF THE DRAWINGS

In order that the advantages of the invention will be readily understood, a more particular description of the invention briefly described above will be rendered by reference to specific embodiments illustrated in the appended drawings. Understanding that these drawings depict only typical embodiments of the invention and are not therefore to be considered limiting of its scope, the invention will be described and explained with additional specificity and detail through use of the accompanying drawings, in which.

DETAILED DESCRIPTION

Figure 1:
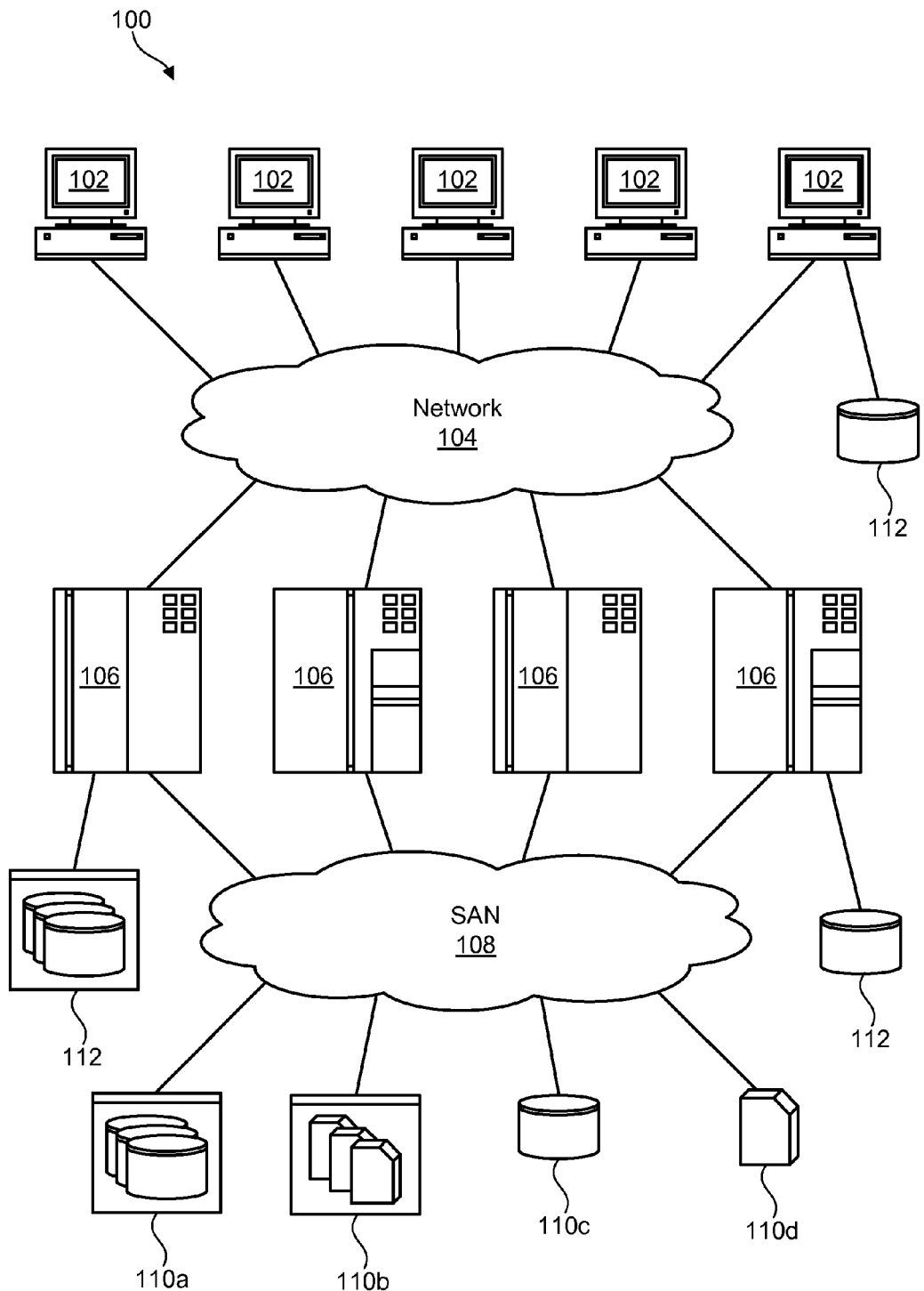
FIG. 1 is a high-level block diagram showing one example of a network architecture comprising various storage systems.

It will be readily understood that the components of the present invention, as generally described and illustrated in the Figures herein, could be arranged and designed in a wide variety of different configurations. Thus, the following more detailed description of the embodiments of the invention, as represented in the Figures, is not intended to limit the scope of the invention, as claimed, but is merely representative of certain examples of presently contemplated embodiments in accordance with the invention. The presently described embodiments will be best understood by reference to the drawings, wherein like parts are designated by like numerals throughout.

As will be appreciated by one skilled in the art, the present invention may be embodied as an apparatus, system, method, or computer program product. Furthermore, the present invention may take the form of a hardware embodiment, a software embodiment (including firmware, resident software, micro-code, etc.) configured to operate hardware, or an embodiment combining software and hardware aspects that may all generally be referred to herein as a "module" or "system." Furthermore, the present invention may take the form of a computer-usable storage medium embodied in any tangible medium of expression having computer-usable program code stored therein.

Any combination of one or more computer-usable or computer-readable storage medium(s) may be utilized to store the computer program product. The computer-usable or computer-readable storage medium may be, for example but not limited to, an electronic, magnetic, optical, electromagnetic, infrared, or semiconductor system, apparatus, or device. More specific examples (a non-exhaustive list) of the computer-readable storage medium may include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CDROM), an optical storage device, or a magnetic storage device. In the context of this document, a computer-usable or computer-readable storage medium may be any medium that can contain, store, or transport the program for use by or in connection with the instruction execution system, apparatus, or device.

Computer program code for carrying out operations of the present invention may be written in any combination of one or more programming languages, including an object-oriented programming language such as Java, Smalltalk, C++, or the like, and conventional procedural programming languages, such as the "C" programming language or similar programming languages. Computer program code for implementing the invention may also be written in a low-level programming language such as assembly language.

The present invention may be described below with reference to flowchart illustrations and/or block diagrams of methods, apparatus, systems, and computer program products according to various embodiments of the invention. It will be understood that each block of the flowchart illustrations and/or block diagrams, and combinations of blocks in the flowchart illustrations and/or block diagrams, can be implemented by computer program instructions or code. These computer program instructions may be provided to a processor of a general-purpose computer, special-purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

The computer program instructions may also be stored in a computer-readable storage medium that can direct a computer or other programmable data processing apparatus to function in a particular manner, such that the instructions stored in the computer-readable storage medium produce an article of manufacture including instruction means which implement the function/act specified in the flowchart and/or block diagram block or blocks. The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

Referring to FIG. 1, one example of a network architecture 100 is illustrated. The network architecture 100 is presented to show one example of an environment where a near continuous data protection methodology in accordance with the invention may be implemented. The network architecture 100 is presented only by way of example and not limitation. Indeed, the apparatus and methods disclosed herein may be applicable to a wide variety of different network architectures in addition to the network architecture 100 shown.

As shown, the network architecture 100 includes one or more computers 102, 106 interconnected by a network 104. The network 104 may include, for example, a local-area-network (LAN) 104, a wide-area-network (WAN) 104, the Internet 104, an intranet 104, or the like. In certain embodiments, the computers 102, 106 may include both client computers 102 and server computers 106 (also referred to herein as "host systems" 106). In general, the client computers 102 initiate communication sessions, whereas the server computers 106 wait for requests from the client computers 102. In certain embodiments, the computers 102 and/or servers 106 may connect to one or more internal or external direct-attached storage systems 112 (e.g., arrays of hard-disk drives, solid-state drives, tape drives, etc.). These computers 102, 106 and direct-attached storage systems 112 may communicate using protocols such as ATA, SATA, SCSI, SAS, Fibre Channel, or the like. One or more of the storage systems 112 may utilize the near continuous data protection methodology disclosed herein.

The network architecture 100 may, in certain embodiments, include a storage network 108 behind the servers 106, such as a storage-area-network (SAN) 108 or a LAN 108 (e.g., when using network-attached storage). This network 108 may connect the servers 106 to one or more storage systems 110, such as arrays 110a of hard-disk drives or solid-state drives, tape libraries 110b, individual hard-disk drives 110c or solid-state drives 110c, tape drives 110d, CD-ROM libraries, or the like. To access a storage system 110, a host system 106 may communicate over physical connections from one or more ports on the host 106 to one or more ports on the storage system 110. A connection may be through a switch, fabric, direct connection, or the like. In certain embodiments, the servers 106 and storage systems 110 may communicate using a networking standard such as Fibre Channel (FC). One or more of the storage systems 110 may utilize the near continuous data protection methodology disclosed herein.

Figure 2:
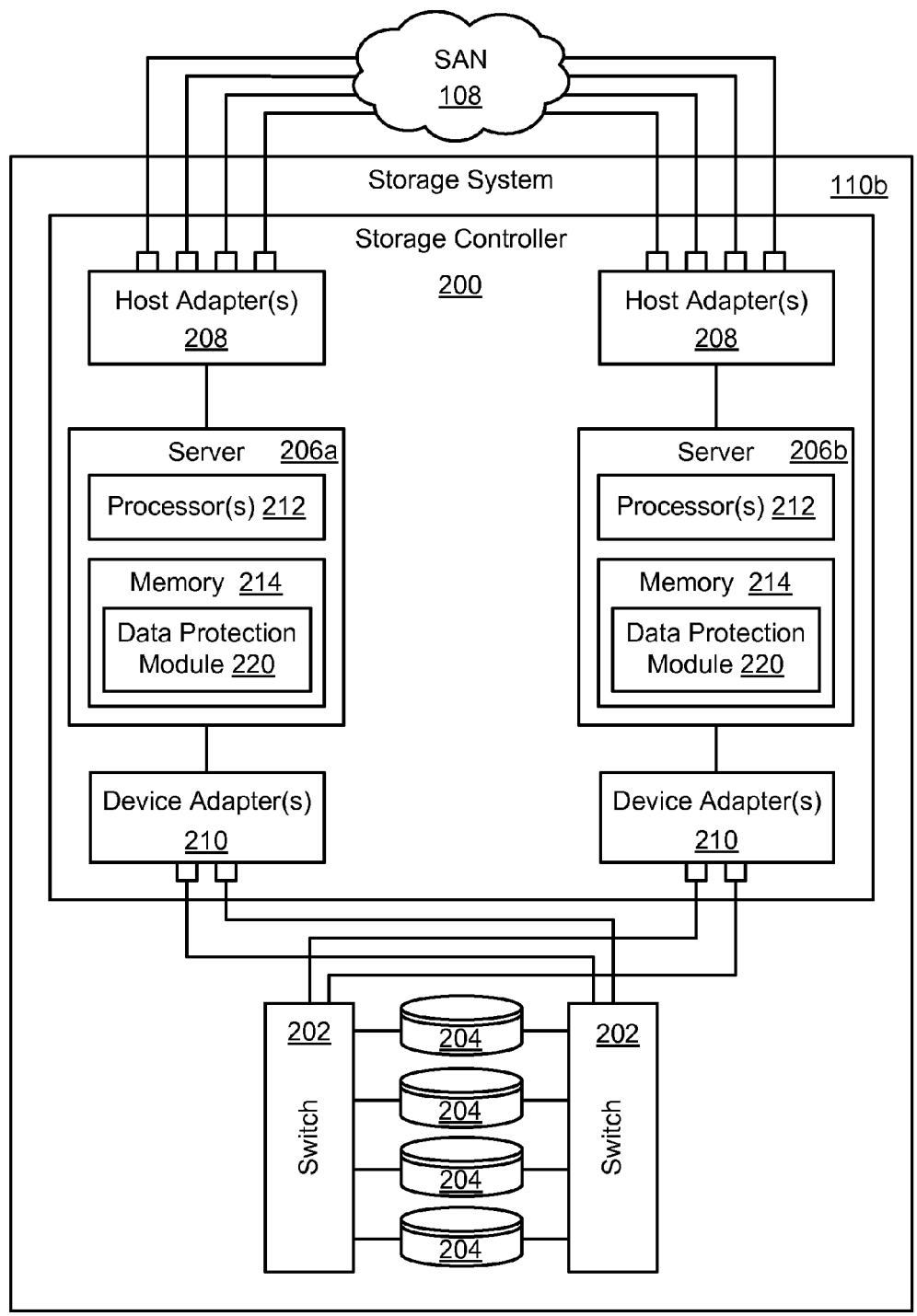
FIG. 2 is a high-level block diagram showing one example of a storage system where an apparatus and method in accordance with the invention may be implemented.

Referring to FIG. 2, one embodiment of a storage system 110b containing an array of hard-disk drives 204 and/or solid-state drives 204 is illustrated. The internal components of the storage system 110b are shown since the near continuous data protection methodology may, in certain embodiments, be implemented within such a storage system 110b, although the methodology may also be applicable to other storage systems 110. As shown, the storage system 110b includes a storage controller 200, one or more switches 202, and one or more storage devices 204, such as hard disk drives 204 or solid-state drives 204 (such as flash-memory-based drives 204). The storage controller 200 may enable one or more hosts 106 (e.g., open system and/or mainframe servers 106) to access data in the one or more storage devices 204.

In selected embodiments, the storage controller 200 includes one or more servers 206. The storage controller 200 may also include host adapters 208 and device adapters 210 to connect the storage controller 200 to host devices 106 and storage devices 204, respectively. Multiple servers 206a, 206b may provide redundancy to ensure that data is always available to connected hosts 106. Thus, when one server 206a fails, the other server 206b may pick up the I/O load of the failed server 206a to ensure that I/O is able to continue between the hosts 106 and the storage devices 204. This process may be referred to as a "failover." During normal operation (when both servers 206a, 206b are operational), each of the servers 206a, 206b may manage I/O to different logical subsystems (LSSs) of the storage system 110b. For example, the first server 206a may handle I/O to even LSSs, while the second server 206b handles I/O to odd LSSs.

One example of a storage system 110b having an architecture similar to that illustrated in FIG. 2 is the IBM DS8000™ enterprise storage system. The DS8000™ is a high-performance, high-capacity storage controller providing disk storage that is designed to support continuous operations. Nevertheless, the apparatus and methods disclosed herein are not limited to the IBM DS8000™ enterprise storage system 110b, but may be implemented in any comparable or analogous storage system 110, regardless of the manufacturer, product name, or components or component names associated with the system 110. Furthermore, any storage system that could benefit from one or more embodiments of the invention is deemed to fall within the scope of the invention. Thus, the IBM DS8000™ is presented only by way of example and is not intended to be limiting.

In selected embodiments, each server 206 may include one or more processors 212 and memory 214. The memory 214 may include volatile memory (e.g., RAM) as well as non-volatile memory (e.g., ROM, EPROM, EEPROM, hard disks, flash memory, etc.). The volatile and non-volatile memory may, in certain embodiments, store software modules that run on the processor(s) 212 and are used to access data in the storage devices 204. The servers 206 may host at least one instance of these software modules. These software modules may manage all read and write requests to logical volumes in the storage devices 204.

As shown, each of the servers 206a, 206b includes a data protection module 220 to implement the near continuous data protection methodology in the storage devices 204 that it manages. To protect data in the storage devices 204, each data protection module 220 is configured to take snapshots of source data in the storage devices 204 at desired intervals, and store these snapshots. These snapshots may be used to restore the source data in the event the source data is corrupted or lost. The function and operation of each data protection module 220 will be discussed in more detail in association with FIGS. 3 through 8.

Figure 3:
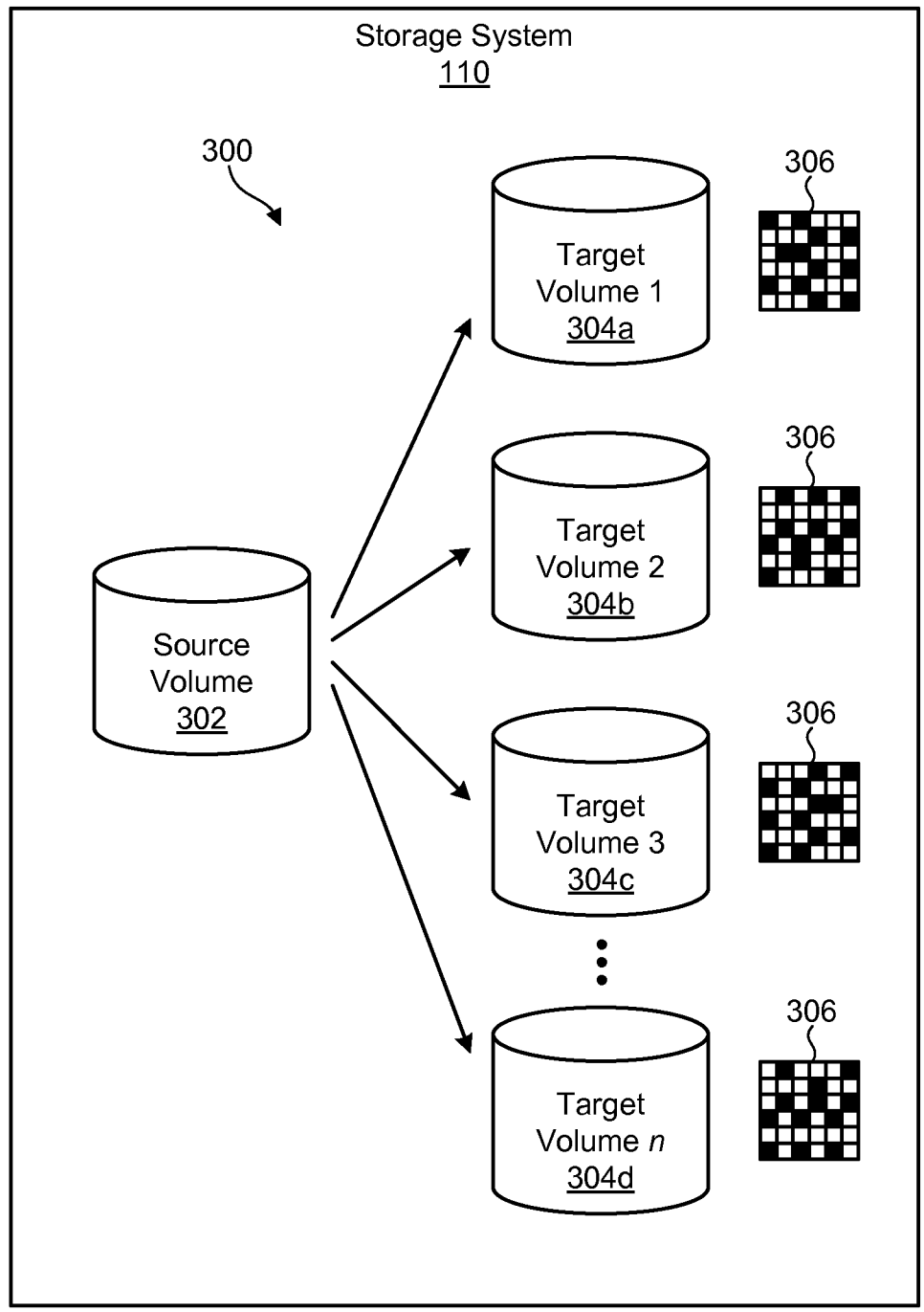
FIG. 3 is a high-level block diagram showing a source volume and multiple target volumes.

Referring to FIG. 3, as a data protection module 220 takes snapshots of source data, a multi-target architecture 300 like that illustrated in FIG. 3 may be generated. As shown, the multi-target architecture 300 includes a source volume 302, containing source data, and one or more target volumes 304a-d, each containing a snapshot (i.e., a point-in-time copy) of the source data at a different point in time. In selected embodiments, such as when using IBM's FlashCopy, a point-in-time copy may be instantaneously created by establishing a relation (or "mapping") between a source volume 302 and a target volume 304. Once this relation is established, data may be read from either the source volume 302 or target volume 304 even though data may still not be physically copied from the source volume 302 to the target volume 304. If desired, data may be copied between the source volume 302 and target volume 304 in a background process or a "no copy" option may be selected that only copies data when required.

A target bit map (TBM) 306 associated with each target volume 304 keeps track of which data tracks have actually been copied from the source volume 302 to the target volume 304. For example, a "0" in the TBM 306 may indicate that a data track has been copied (i.e., the target volume 304 contains the data), whereas a "1" may indicate that a data track has not yet been copied. In cases where the TBM 306 contains a "1," a read to a track on the target volume 306 may be directed to the corresponding track on the source volume 302. For the purposes of this disclosure, a bit in a TBM 304 is said to be "set" if it contains a "1" and "reset" if it contains a "0," although this could be reversed in other embodiments. Although the source 302 and targets 304 are shown as single volumes in the illustrated embodiment, it should be recognized that the source 302 and targets 304 could also be groups of volumes, datasets, or other collections of data.

In conventional multi-target architectures 300, a write to a source volume 302 may need to wait for data in the source volume 302 to be copied (i.e., destaged) to each connected target volume 304a-d not containing its own data before the write can be completed on the source volume 302. That is, before a write is performed on a data track of the source volume 302, the existing data track needs to be copied to target volumes 304a-d that do not already contain the data in the data track before the data on the source volume 302 is overwritten. The larger the number of target volumes 304a-d in the multi-target architecture 300, the larger number of copies that need to occur before data can be successfully written to the source volume 302. This can make a write to the source volume 302 very slow. For this reason, conventional point-in-time-copy technologies may only support a limited number (e.g., twelve) of targets 304 in multi-target architectures 300 to keep the performance impact within an acceptable range.

To overcome this limitation, an inheritance scheme may be implemented to reduce the performance impact of having multiple target volumes 304a-d mapped to a source volume 302. In such an inheritance scheme, instead of copying data to multiple targets 304a-d when a write is performed on the source volume 302, data is copied to a single target 304 or a subset of the targets 304. The inheritance scheme then enables other targets 304 to inherit the data from the single target 304 or subset of targets 304 that contain the data. In this way, a write to a source volume 302 may only need to copy data to a single target 304 or a subset of the targets 304 before the write can be completed on the source volume 302. Such an inheritance scheme is disclosed, for example, in co-pending U.S. patent application Ser. No. 13/043,394 entitled MULTI-TARGET, POINT-IN-TIME-COPY ARCHITECTURE WITH DATA DEDUPLICATION, co-pending U.S. patent application Ser. No 13/043,398 entitled DELETING RELATIONS IN MULTI-TARGET, POINT-IN-TIME-COPY ARCHITECTURES WITH DATA DEDUPLICATION, and co-pending U.S. patent application Ser. No. 13/043,409 entitled DELETING RELATIONS BETWEEN SOURCES AND SPACE-EFFICIENT TARGETS IN MULTI-TARGET ARCHITECTURES, which are herein incorporated by reference in their entirety.

Figure 4:
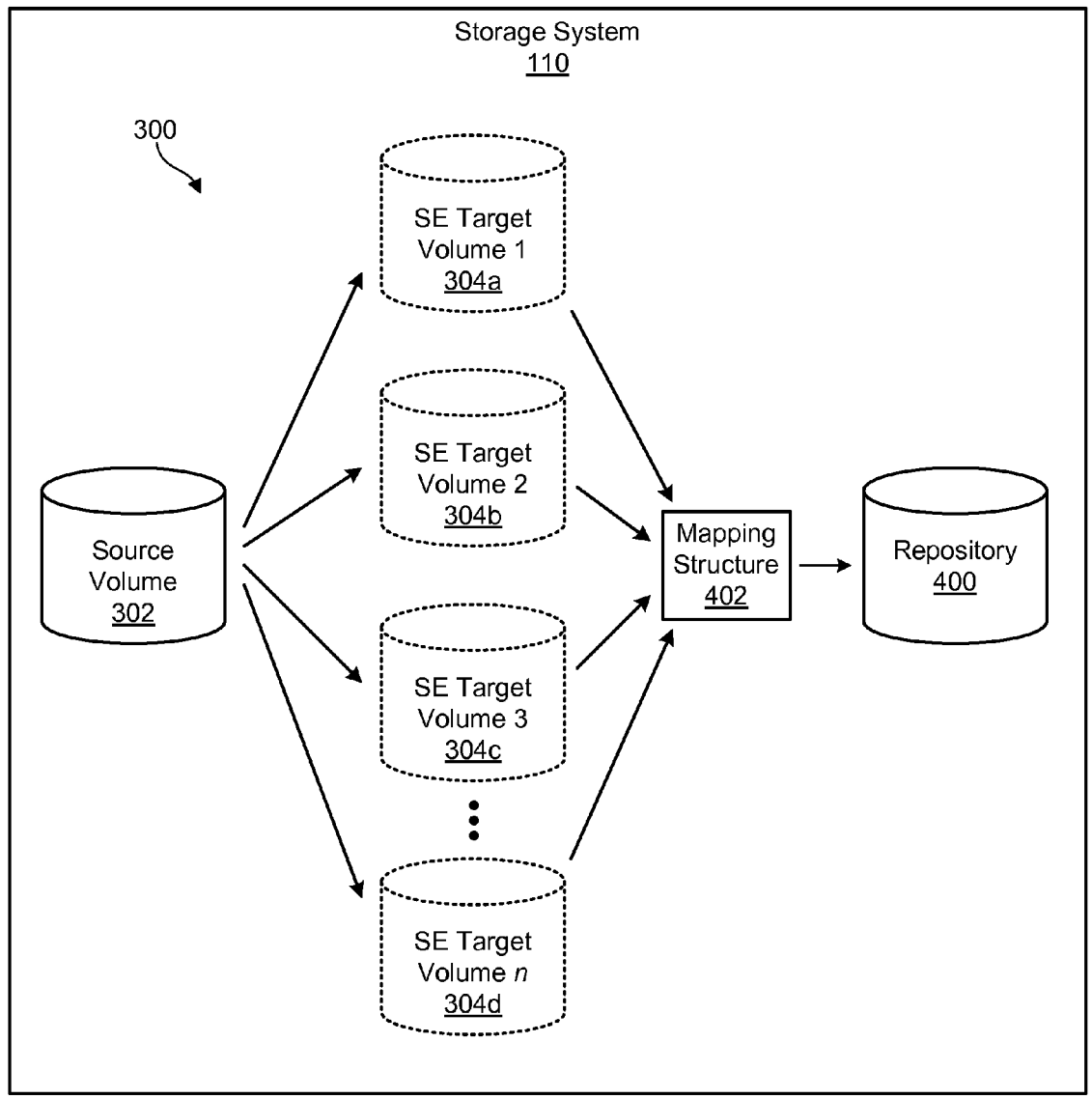
FIG. 4 is a high-level block diagram showing a source volume and multiple space-efficient target volumes.

Referring to FIG. 4, in certain embodiments in accordance with the invention, the target volumes 304 are implemented as space-efficient (SE) target volumes 304. An SE target volume 304 differs from a standard target volume 304 (such as those illustrated in FIG. 3) in that data is not physically stored in the volume. Rather, the SE target volume 304 is a virtual volume (as indicated by the dotted lines) whose data is physically stored in a common repository 400. A mapping structure 402 keeps track of where a SE target volume's data is physically located in the repository 400. Stated otherwise, the mapping structure 402 maps logical tracks of the SE target volume 304 to physical tracks of the repository 400. Compared to standard target volumes 304, SE target volumes 304 utilize storage space more efficiently. From the perspective of a host device 106, reading from or writing to a SE target volume 304 may be the same as reading from or writing to a standard target volume.

Figure 5:
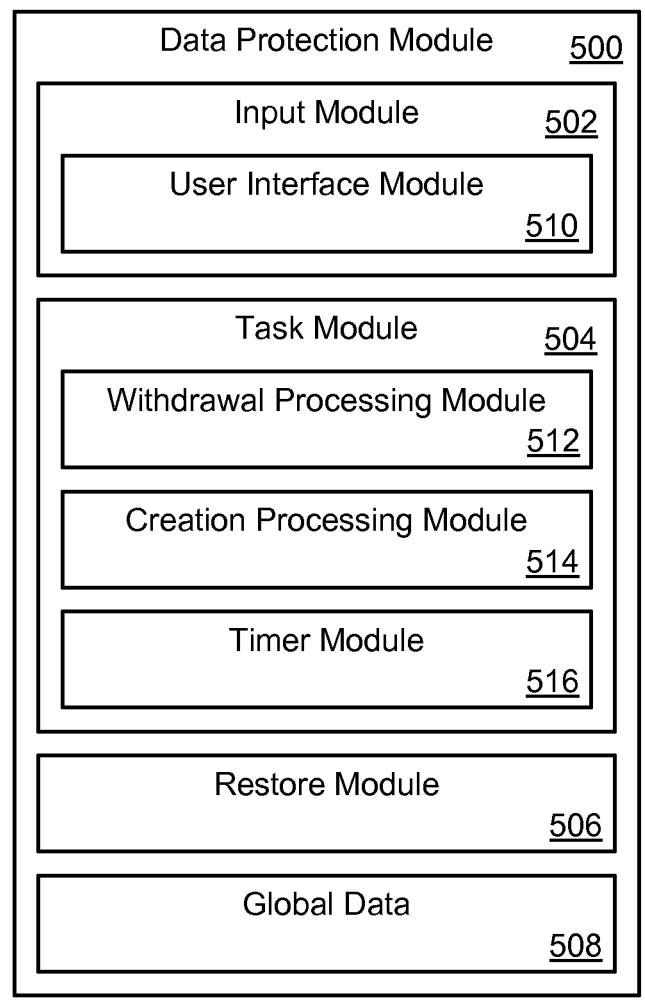
FIG. 5 is a high-level block diagram showing one embodiment of a data protection module in accordance with the invention.

Referring to FIG. 5, one embodiment of a data protection module 500 for providing near continuous data protection is illustrated. The data protection module 500 may include one or more modules to provide various features and functions. These modules may be implemented in hardware, software or firmware executable on hardware, or a combination thereof. These modules are presented only by way of example and are not intended to be limiting. Indeed, alternative embodiments may include more or fewer modules than those illustrated.

As shown, the data protection module 500 includes an input module 502, a task module 504, and a restore module 506. The input module 502 may enable a user or software to provide various types of global data 508 to the data protection module 500. In selected embodiments, the input module 502 includes a user interface module 510. The user interface module 510 may provide a user interface, such as a graphical user interface, command line interface, or the like, to enable the user to input various items of global data 508.

Figure 6:
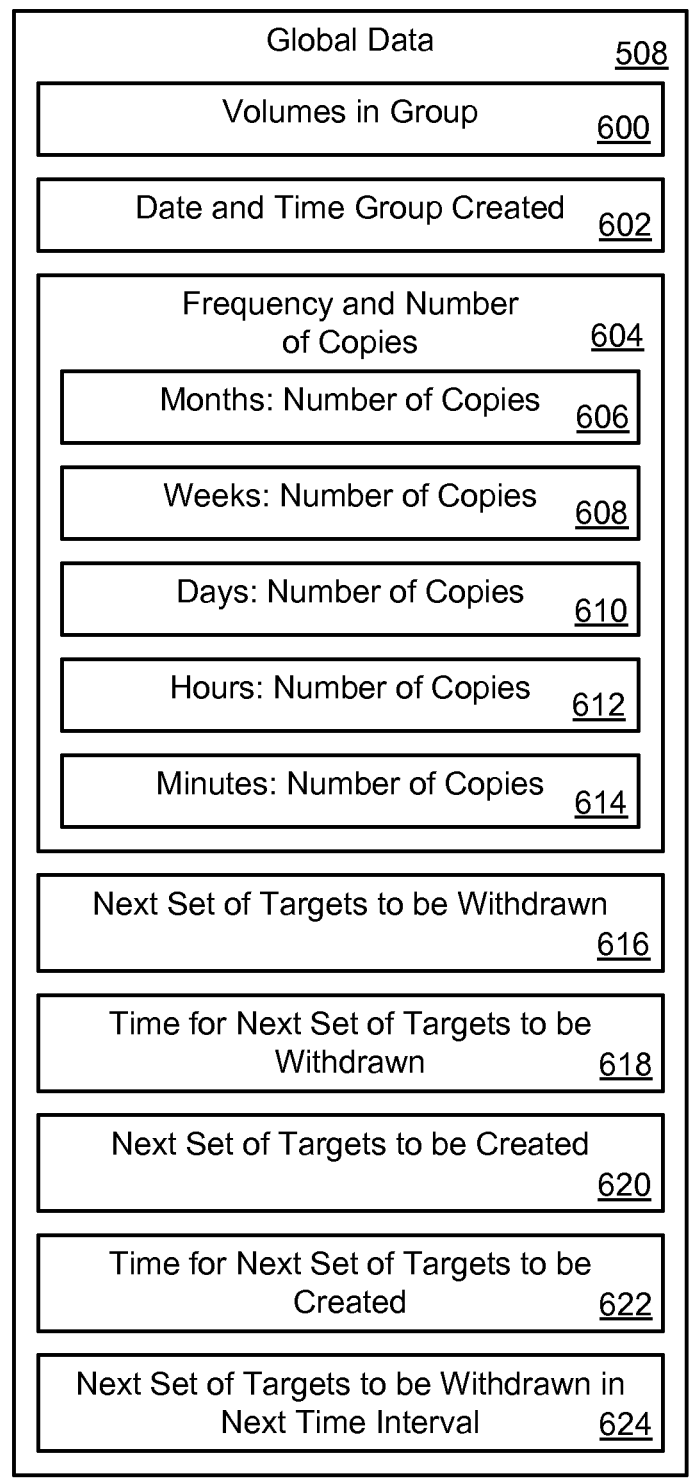
FIG. 6 is a high-level block diagram showing various types of global data used by the data protection module.

For example, as shown in FIG. 6, the user interface module 510 may enable a user to specify a group 600 of one or more volumes 302 to protect with the near continuous data protection methodology. A user or software may also specify the frequency and number of point-in-time copies to generate and retain for the group 600. For example, the user may specify a number 606 of copies to retain on a monthly basis, a number 608 of copies to retain on a weekly basis, a number 610 of copies to retain on a daily basis, a number 612 of copies to retain on an hourly basis, a number 614 of copies to retain on a minutely basis, and so forth. These intervals are provided only by way of example and are not intended to be limiting. Intervals having other levels of granularity may also be used. In general, each interval may be (n≧2) multiple of the preceding interval. For example, a week is a (n=7) multiple of a day; a day is a (n=24) multiple of an hour; an hour is a (n=60) multiple of a minute, and so forth.

Using the intervals illustrated in FIG. 6, point-in-time copies would be generated and retained each minute until the specified number 614 of copies is reached. Of the minutely copies, one copy per hour would be retained until the specified number 612 of copies is reached. Of the hourly copies, one copy per day would be retained until the specified number 610 of copies is reached. Of the daily copies, one copy per week would be retained until the specified number 608 of copies is reached. Of the weekly copies, one copy per month would be retained until the specified number 606 of copies is reached. Any point-in-time copies not retained may be deleted to free up storage space. Once a point-in-time copy is deleted, the target volume 304 that stores the point-in-time copy may be withdrawn (i.e., deleted). Similarly, anytime a point-in-time copy is generated, a target volume 304 to store the point-in-time copy is created.

Other global data 508 that may be used by the data protection module 500 while operating include the date 602 and time 602 the group 600 was created, the next set 616 of targets to be withdrawn, the time 618 for the next set of targets to be withdrawn, the next set 620 of targets to be created, the time 622 for the next set of targets to be created, and the next set 624 of targets to be withdrawn in the next time interval (e.g., 1-hour interval). The manner in which the global data 508 is used will be described in more detail hereafter. Other items of data may be stored in the global data 510, as needed.

Referring again to FIG. 5, once all required global data 508 is provided, a task module 504 may generate point-in-time copies of the data in the specified group 600 of volumes at the specified intervals 604, as well as delete the point-in-time copies when appropriate. To accomplish this, the task module 504 includes a withdrawal processing module 512 to withdraw target volumes 304 when needed. The operation of the withdrawal processing module 512 will be discussed in association with FIG. 7. The task module 504 also includes a creation processing module 514 to create target volumes 304 when needed. The operation of the creation processing module 514 will be discussed in association with FIG. 8.

A timer module 516 may be provided to control when the task module 504 wakes up and performs its various tasks. Each time the task module 504 wakes up, the timer module 516 examines the time 618 for the next set of targets to be withdrawn and the time 622 for the next set of targets to be created. The timer module 516 then sets a timer to wake up the task module 504 at the earliest of the times 618, 622. Once the timer is set, the task module 504 may go to sleep. The timer module 516 may then wake up the task module 504 when the timer expires.

The restore module 506 may be used to restore the source data to a previous point in time in the event the source data is corrupted or lost. To accomplish this, the restore module 506 may receive a volume or group of volumes as input and a desired restore time from which to restore. For each volume in the volume group, the restore module 506 may find the newest of all targets 304 that were established before the restore time. Alternatively, the restore module 506 may find the oldest of all targets 304 that were established after the restore time. In certain embodiments, a user may be allowed to choose between the two alternatives. Once a target 304 is selected from which to restore, the restore module 506 restores the selected target volume 304 to the source volume 302. In certain embodiments, this may be accomplished by creating a cyclic point-in-time copy from the target volume 304 to the source volume 302, as will be explained in associated with FIG. 9.

Figure 7:
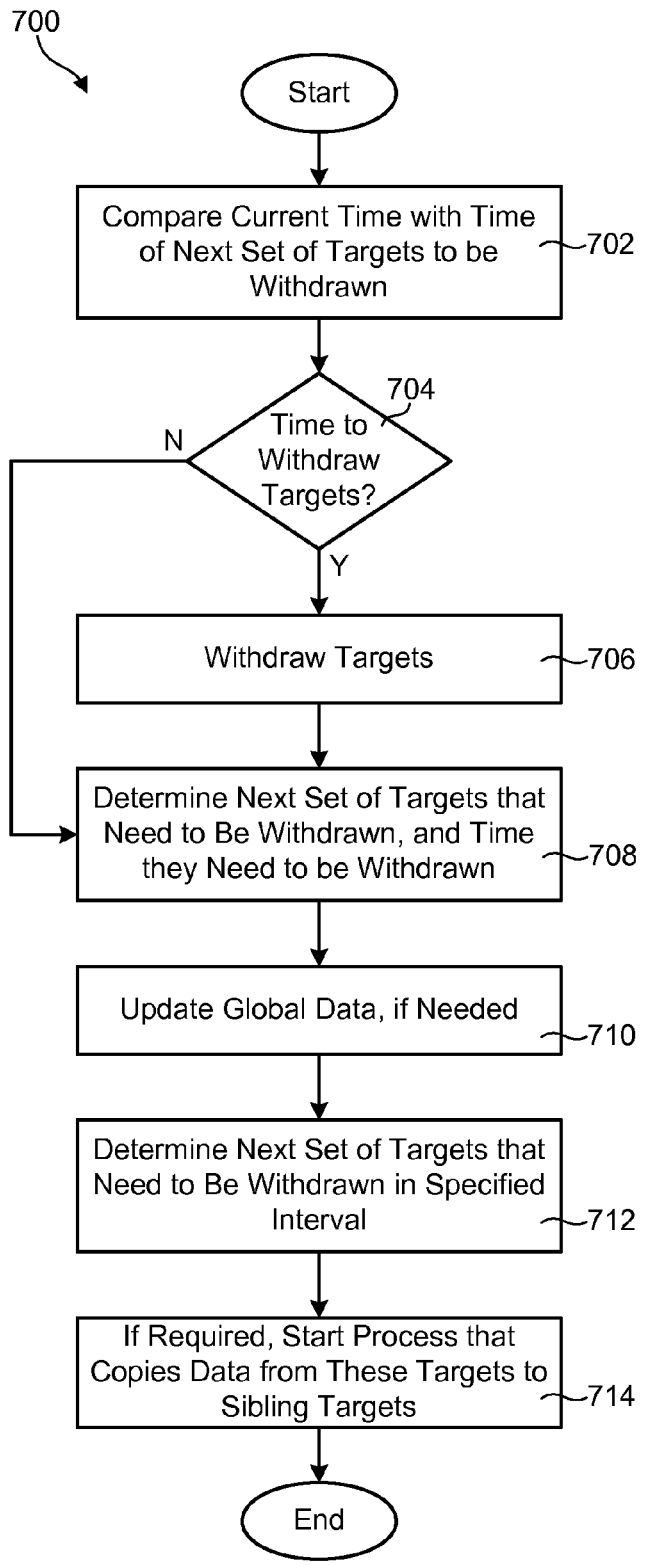
FIG. 7 is a flow diagram showing one embodiment of a method for withdrawing targets when providing near continuous data protection.

Referring to FIG. 7, one embodiment of a method 700 for withdrawing targets at appropriate times is illustrated. Such a method 700 may be executed by the withdrawal processing module 512 each time the task module 504 wakes up. As shown, the method 700 initially compares 702 the current time with the time 618 for next set of targets to be withdrawn. If it is time to withdraw the next set of targets, as determined at step 704, the method 700 withdraws 706 the targets. If it is not yet time to withdraw the next set of targets, the method 700 skips the withdrawal step 706. The method 700 then determines 708 the next set 616 of targets to be withdrawn, and the time 618 for the next set of targets to be withdrawn. The method 700 updates 710 the corresponding fields 616, 618 in the global data 508, if needed.

The method 700 then determines 712 the next set 624 of targets to be withdrawn in the next time interval (such as a 1-hour time interval). If these targets contain data that is inherited by other targets, the method 700 starts 714 a process that copies the inherited data from these targets to other sibling targets. In certain embodiments, for example, the data may be copied to closest older sibling targets, as described in the co-pending patent applications identified herein. If the targets 304 being withdrawn are standard target volumes 304, then the data is physically copied to the sibling target volumes 304. If the targets 304 are space-efficient (SE) target volumes, then the mapping structure 402 is modified to logically copy the data. Stated otherwise, instead of physically copying data from one SE target volume to another, as may occur with standard target volumes, the mapping structure 402 is modified so that data that is logically stored in one SE target volume is now logically stored in another SE target volume.

Thus, prior to deleting a target volume 304, data on the target volume 304 may be copied to one or more sibling target volumes 304 so that the data is still accessible to the sibling target volumes 304.

Figure 8:
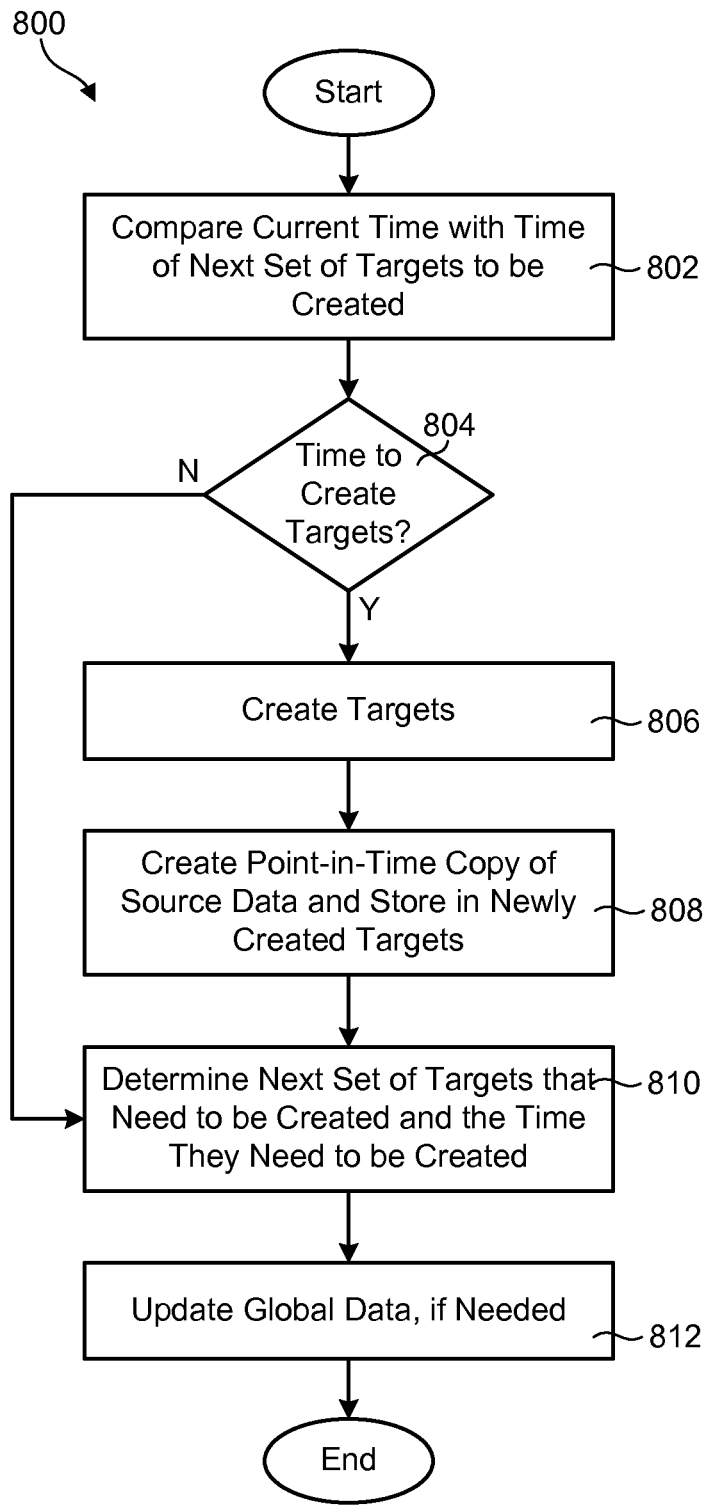
FIG. 8 is a flow diagram showing one embodiment of a method for creating targets when providing near continuous data protection.

Referring to FIG. 8, one embodiment of a method 800 for creating targets 304 is illustrated. Such a method 800 may be executed by the creation processing module 514 each time the task module 504 wakes up. As shown, the method 800 initially compares 802 the current time with the time 622 for the next set of targets to be created. If it is time to create the next set of targets, as determined at step 804, the method 800 creates 806 the targets. The method then creates 808 a point-in-time copy of the source data and stores it in the newly created targets. If it is not time to create the next set of targets, then the method 800 skips steps 806, 808. The method 800 then determines 810 the next set 620 of targets to be created and the time 622 for the next set of targets to be created. The method 700 then updates 812 the corresponding fields 620, 622 in the global data 508, as needed.

Figure 9:
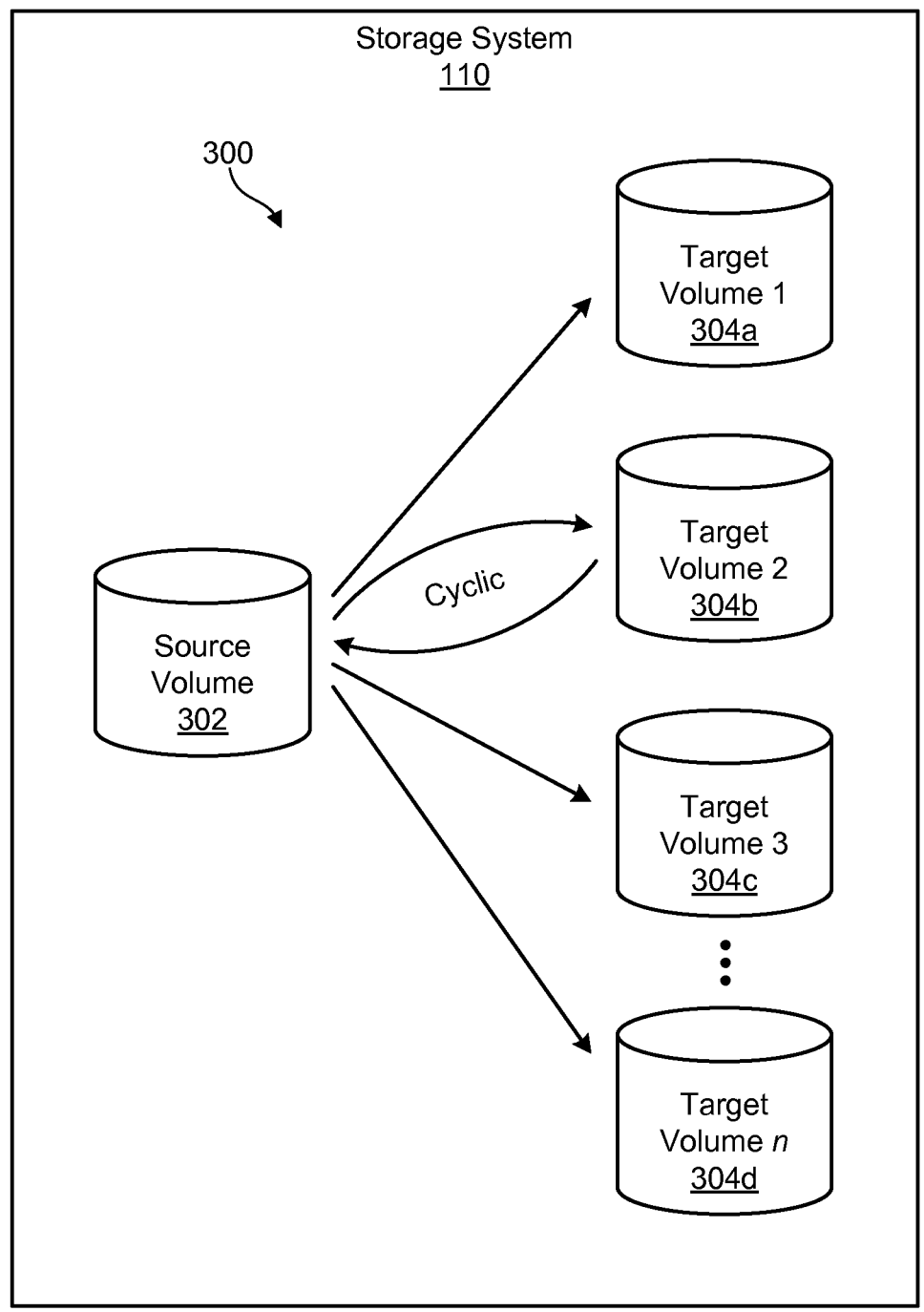
FIG. 9 is a high-level block diagram showing an example of restoring source data by creating a cyclic point-in-time copy from a target volume to a source volume.

Referring to FIG. 9, as previously mentioned, in certain embodiments, the restore module 506 may restore source data to a previous point in time by creating a cyclic point-in-time copy from a target volume 304 to a source volume 302. For example, assume that a user wants to restore source data to the point-in-time copy that is stored in the target volume 304b. In such a case, the source data may be quickly restored to the previous point in time by creating a cyclic point-in-time copy from the target volume 304b to the source volume 302. In such a case, the target volume 304b becomes a source for the source volume 302 in order to restore data thereto.

The flowcharts and block diagrams in the Figures illustrate the architecture, functionality, and operation of possible implementations of systems, methods, and computer-usable media according to various embodiments of the present invention. In this regard, each block in the flowcharts or block diagrams may represent a module, segment, or portion of code, which comprises one or more executable instructions for implementing the specified logical function(s). It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, may be implemented by special purpose hardware-based systems that perform the specified functions or acts, or combinations of special purpose hardware and computer instructions.

The invention claimed is:

1. A method for providing rolling continuous data protection of source data, the method comprising:
   enabling a user to select source data;
   enabling the user to establish a first interval when point-in-time copies of the source data are generated;
   enabling the user to specify a first number of point-in-time copies to retain at the first interval;
   enabling the user to specify a second number of point-in-time copies to retain at a second interval, wherein the second interval is a ($n \geq 2$) multiple of the first interval;
   enabling the user to specify a third number of point-in-time copies to retain at a third interval, wherein the third interval is a ($n \geq 2$) multiple of the second interval; and
   providing functionality to delete point-in-time copies that are not retained in accordance with the first, second, and third numbers.

2. The method of claim 1, wherein the source data comprises at least one source volume.

3. The method of claim 1, wherein the point-in-time copies are contained in one of conventional target volumes and space-efficient target volumes.

4. The method of claim 1, wherein deleting point-in-time copies comprises determining the next set of point-in-time copies to be deleted.

5. The method of claim 4, wherein determining the next set of point-in-time copies to be deleted further comprises initiating a data copy process from the next set of point-in-time copies to be deleted to a set of newer point-in-time copies.

6. The method of claim 5, wherein the data copy process physically copies data.

7. The method of claim 5, wherein the data copy process modifies mapping information associated with data.

8. A computer program product for providing rolling continuous data protection of source data, the computer program product comprising a non-transitory computer-readable storage medium having computer-usable program code embodied therein, the computer-usable program code comprising:
   computer-usable program code to enable a user to select source data;
   computer-usable program code to enable the user to establish a first interval when point-in-time copies of the source data are generated;
   computer-usable program code to enable the user to specify a first number of point-in-time copies to retain at the first interval;
   computer-usable program code to enable the user to specify a second number of point-in-time copies to retain at a second interval, wherein the second interval is a ($n \geq 2$) multiple of the first interval;
   computer-usable program code to enable the user to specify a third number of point-in-time copies to retain at a third interval, wherein the third interval is a ($n \geq 2$) multiple of the second interval; and
   computer-usable program code to delete point-in-time copies that are not retained in accordance with the first, second, and third numbers.

9. The computer program product of claim 8, wherein deleting point-in-time copies comprises determining the next set of point-in-time copies to be deleted.

10. The computer program product of claim 9, wherein determining the next set of point-in-time copies to be deleted further comprises initiating a data copy process from the next set of point-in-time copies to be deleted to a set of newer point-in-time copies.

11. The computer program product of claim 10, wherein the data copy process physically copies data.

12. The computer program product of claim 10, wherein the data copy process modifies mapping information associated with data.

13. An apparatus to provide rolling continuous data protection of source data, the apparatus comprising:
   a plurality of modules implemented in at least one of hardware and a combination of hardware and software, the modules comprising:
   an input module to enable a user to select source data;
   the input module further configured to enable the user to establish a first interval when point-in-time copies of the source data are generated;
   the input module further configured to enable the user to specify a first number of point-in-time copies to retain at the first interval;
   the input module further configured to enable the user to specify a second number of point-in-time copies to retain at a second interval, wherein the second interval is a (n≧2) multiple of the first interval;

the input module further configured to enable the user to specify a third number of point-in-time copies to retain at a third interval, wherein the third interval is a (n≧2) multiple of the second interval; and a withdraw processing module to delete point-in-time copies that are not retained in accordance with the first, second, and third numbers.

14. The apparatus of claim 13, wherein the withdraw processing module is further configured to, when deleting point-in-time copies, determine the next set of point-in-time copies to be deleted.

15. The apparatus of claim 14, wherein the withdraw processing module is further configured to, upon determining the next set of point-in-time copies to be deleted, initiate a data copy process from the next set of point-in-time copies to be deleted to a set of newer point-in-time copies.

16. The apparatus of claim 15, wherein the data copy process physically copies data.

17. The apparatus of claim 15, wherein the data copy process modifies mapping information associated with data.

* * * * *